United States Patent
Mimura et al.

(10) Patent No.: US 12,418,015 B2
(45) Date of Patent: Sep. 16, 2025

(54) METHOD FOR MANUFACTURING ELECTRODE AND ELECTRODE PASTE COATING DEVICE

(71) Applicants: PRIME PLANET ENERGY & SOLUTIONS, INC., Tokyo (JP); TOYOTA JIDOSHA KABUSHIKI KAISHA, Toyota (JP)

(72) Inventors: Tetsuya Mimura, Chiryu (JP); Katsushi Enokihara, Toyota (JP)

(73) Assignees: PRIME PLANET ENERGY & SOLUTIONS, INC., Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 839 days.

(21) Appl. No.: 17/521,158

(22) Filed: Nov. 8, 2021

(65) Prior Publication Data

US 2022/0158154 A1 May 19, 2022

(30) Foreign Application Priority Data

Nov. 18, 2020 (JP) ................ 2020-191777

(51) Int. Cl.
H01M 4/04 (2006.01)
(52) U.S. Cl.
CPC ....... *H01M 4/0435* (2013.01); *H01M 4/0404* (2013.01)
(58) Field of Classification Search
CPC combination set(s) only.
See application file for complete search history.

(56) References Cited

U.S. PATENT DOCUMENTS

| | | |
|---|---|---|
| 2011/0189378 A1 | 8/2011 | Moon et al. |
| 2013/0183438 A1 | 7/2013 | Suzuki |
| 2020/0168889 A1 | 5/2020 | Tanaka |

FOREIGN PATENT DOCUMENTS

| | | |
|---|---|---|
| CN | 105190957 A | 12/2015 |
| CN | 105531865 A | 4/2016 |
| JP | 02-203963 A | 8/1990 |
| JP | 2000-353515 A | 12/2000 |
| JP | 2002-042789 A | 2/2002 |
| JP | 2012-009297 A | 1/2012 |
| JP | 2013-140680 A | 7/2013 |

(Continued)

OTHER PUBLICATIONS

Reference_JP2013140680A_ESPACENET_Translation (Year: 2013).*
JP2018037198A—machine translation (Year: 2018).*

*Primary Examiner* — Haroon S. Sheikh
(74) *Attorney, Agent, or Firm* — Finnegan, Henderson, Farabow, Garrett and Dunner, LLP

(57) ABSTRACT

A method for manufacturing an electrode is provided, the method including coating and drying of an electrode paste and being able to highly suppress variations in the weight per unit area of the active material layer. The method for manufacturing an electrode disclosed herein includes the steps of: coating an electrode paste onto a current collecting foil from a die; and drying the coated electrode paste. Here, the current collecting foil is conveyed by a backup roll. A variation in at least one of thickness and width of the coated electrode paste is measured. The peripheral speed of the backup roll is changed according to a measurement result of the variation so that the variation becomes small.

2 Claims, 4 Drawing Sheets

(56) References Cited

FOREIGN PATENT DOCUMENTS

| | | | |
|---|---|---|---|
| JP | 2016-219343 A | | 12/2016 |
| JP | 2018037198 A | * | 3/2018 |
| JP | 2018-081769 A | | 5/2018 |
| JP | 2019-050172 A | | 3/2019 |
| KR | 10-1256068 B2 | | 4/2013 |
| WO | WO 2014-156464 A1 | | 10/2014 |

* cited by examiner

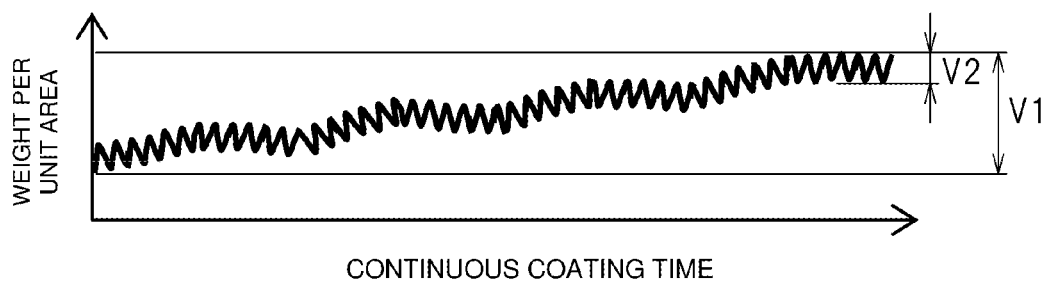
FIG.2
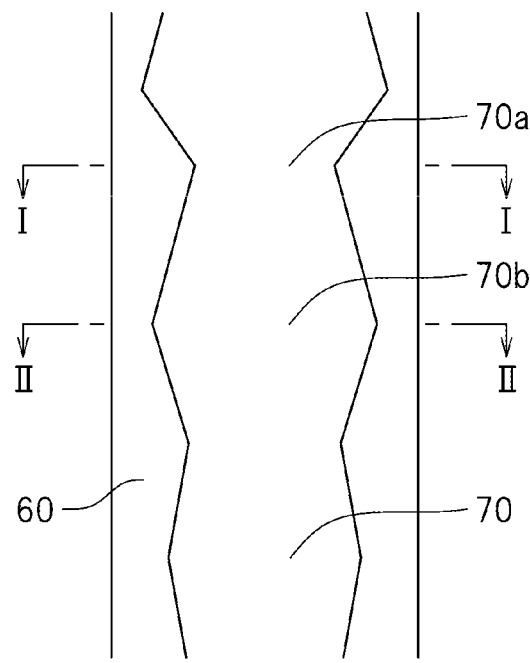
FIG.3A
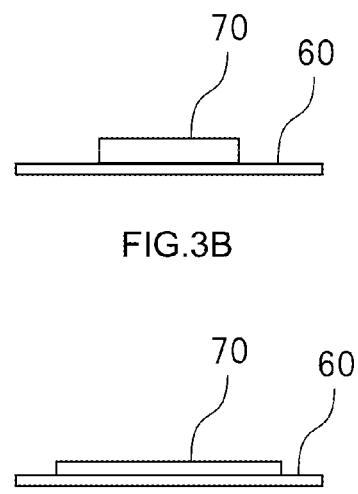
FIG.3B
FIG.3C

METHOD FOR MANUFACTURING ELECTRODE AND ELECTRODE PASTE COATING DEVICE

BACKGROUND OF THE INVENTION

1. Field of the Invention

The present disclosure relates to a method for manufacturing an electrode, with the method including die-coating an electrode paste onto a current collecting foil. The present disclosure also relates to an electrode paste coating device suitable for carrying out the manufacturing method. This application claims priority based on Japanese Patent Application No. 2020-191777 filed on Nov. 18, 2020, and the entire contents of the application are incorporated herein by reference.

2. Description of the Related Art

In recent years, secondary batteries such as lithium ion secondary batteries have been advantageously used as portable power sources for personal computers, mobile terminals, etc., and vehicle drive power sources for battery electric vehicles (BEV), hybrid electric vehicles (HEV), plug-in hybrid electric vehicles (PHEV), and the like.

An electrode, in which an active material layer including an active material is provided on a current collecting foil, is generally used in a secondary battery, particularly a lithium ion secondary battery. Such an electrode is generally manufactured by coating an electrode paste including an active material onto a current collecting foil and drying the coated electrode paste to form an active material layer.

In such a manufacturing method, Japanese Patent Application Publication No. 2000-353515 proposes: monitoring the viscosity of the electrode paste for coating and the coating film thickness or the weight per unit area in a dry state after coating and drying by nondestructive measurement in order to obtain a uniform weight per unit area of the active material layer; obtaining a shrinkage rate indicating the relationship between a coating gap amount of a roll coater and the coating film thickness or the weight per unit area in a dry state on the basis of the monitored paste viscosity; determining the coating gap amount on the basis of the shrinkage ratio and the monitor values of the coating film thickness or the weight per unit area in a dry state; and performing coating by feedback-controlling the coating film thickness or the weight per unit area in a dry state and the coating gap amount.

SUMMARY OF THE INVENTION

In the related art, the weight per unit area of the active material layer is made uniform by feedback-controlling the coating gap amount (μm) of a coater according to the coating film thickness or the weight per unit area in a dry state. However, as a result of diligent studies by the present inventors, it was found that in the related art, although variations in the weight per unit area of the active material layer can be suppressed to some extent by feedback-controlling the coating gap amount, there is still room for improvement regarding the suppression of variations in the weight per unit area.

Therefore, an object of the present disclosure is to provide a method for manufacturing an electrode, with the method including coating and drying of an electrode paste and being able to highly suppress variations in the weight per unit area of the active material layer.

The method for manufacturing an electrode disclosed herein includes the steps of: coating an electrode paste onto a current collecting foil from a die; and drying the coated electrode paste. Here, the current collecting foil is conveyed by a backup roll. A variation in at least one of thickness and width of the coated electrode paste is measured. The peripheral speed of the backup roll is changed according to a measurement result of the variation so that the variation becomes small. With such a configuration, it is possible to provide a method for manufacturing an electrode capable of highly suppressing variations in the weight per unit area of the active material layer.

In a desired embodiment of the method for manufacturing an electrode disclosed herein, the variation to be measured is caused by a backup roll. With such a configuration, the variation in the weight per unit area that is caused by the backup roll can be highly suppressed.

In a desired embodiment of the electrode manufacturing method disclosed herein, the peripheral speed of the backup roll is changed based on Equation (2) below. With such a configuration, the variation in the weight per unit area can be suppressed to a greater extent.

$$V_{BR}=V_{BR\_const}\times\{1-(W(x)/W_{ave}-1)\} \quad (2)$$

$V_{BR}$: Peripheral speed of the backup roll,
$V_{BR\_const}$: Set value of the peripheral speed of the backup roll,
$W(x)$: Coating width at coating distance x, or coating width at time x,
$W_{ave}$: Average value of coating width.

In a desired embodiment of the electrode manufacturing method disclosed herein, the peripheral speed of the backup roll is changed based on Equation (3) below. With such a configuration, the variation in the weight per unit area can be suppressed to a greater extent.

$$V_{BR}=V_{BR\_const}\times\{D(x')D_{ave})\} \quad (3)$$

$V_{BR}$: Peripheral speed of backup roll,
$V_{BR\_const}$: Set value of the peripheral speed of the backup roll,
$D(x')$: Coating thickness at coating distance x', or coating thickness at time x',
$D_{ave}$: Average value of coating thickness.

From another aspect, the electrode paste coating device disclosed herein includes a die coater unit configured to coat an electrode paste onto a current collecting foil, a backup roll configured to convey the current collecting foil, a measuring unit configured to measure a variation of at least one of thickness and width of the coated electrode paste, and a control unit configured to control a peripheral speed of the backup roll. The electrode paste coating device is configured to change the peripheral speed of the backup roll so that the variation becomes small according to a measurement result of the variation. By manufacturing the electrode using this coating device, it is possible to highly suppress the variation of the weight per unit area.

BRIEF DESCRIPTION OF THE DRAWINGS

FIG. 2 is a graph showing an example of a general variation in the weight per unit area that occurs when the electrode paste is continuously coated;

FIG. 3A is a schematic view of a current collecting foil coated with an electrode paste when viewed from a direction perpendicular to the main surface thereof, FIG. 3B is a cross-sectional view along a line I-I of a portion having a large weight per unit area, and FIG. 3C is a cross-sectional view along a line II-II of a portion having a small weight per unit area;

DESCRIPTION OF THE PREFERRED EMBODIMENTS

Figure 1:
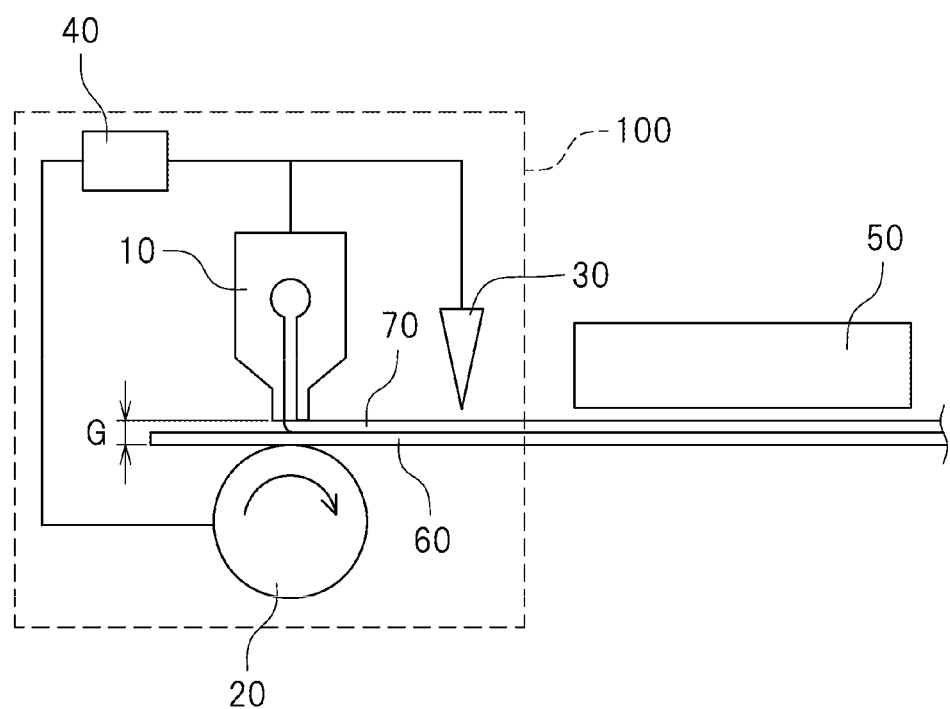
FIG. 1 is a schematic diagram for explaining a method for manufacturing an electrode according to an embodiment of the present disclosure.

Hereinafter, an embodiment of the present disclosure will be described with reference to the drawings. Matters other than those specifically mentioned in the present specification and necessary for implementation can be ascertained as design matters for a person skilled in the art that are based on the related art in the pertinent field. The present disclosure may be carried out based on the contents disclosed in the present description and the common technical knowledge in the pertinent field. Further, in the following drawings, members/parts having the same function may be designated by the same reference numerals for the explanation. Further, the dimensional relations (length, width, thickness, etc.) in each drawing do not reflect the actual dimensional relations.

The method for manufacturing an electrode according to the present embodiment includes the steps of coating an electrode paste onto a current collecting foil from a die (hereinafter, also referred to as "coating step") and drying the coated electrode paste (hereinafter, also referred to as "drying step"). Here, the current collecting foil is conveyed by a backup roll. A variation in the thickness and/or width of the coated electrode paste is measured. The peripheral speed of the backup roll is changed according to the measurement result of the variation so that the variation becomes small.

First, the coating step will be explained. The electrode paste used in the coating step includes an active material and a solvent (dispersion medium). The configuration of the electrode paste may be the same as that of the electrode paste used in a known method for manufacturing an electrode including coating and drying of the electrode paste. An example in which the electrode paste is used in the manufacture of a lithium ion secondary battery will be described hereinbelow.

When an electrode paste is a positive electrode paste for a lithium ion secondary battery, the positive electrode paste includes a positive electrode active material and a solvent. Examples of the positive electrode active material include lithium transition metal oxides (for example, $LiNi_{1/3}Co_{1/3}Mn_{1/3}O_2$, $LiNiO_2$, $LiCoO_2$, $LiFeO_2$, $LiMn_2O_4$, $LiNi_{0.8}Co_{0.15}Al_{0.5}O_2$, $LiNi_{0.5}Mn_{1.5}O_4$, and the like), lithium transition metal phosphates ($LiFePO_4$ and the like), and the like. Examples of the solvent include N-methylpyrrolidone (NMP) and the like.

The positive electrode paste may further include a conductive material, a binder, and the like. Examples of the conductive material include carbon black such as acetylene black (AB) and other carbon materials (graphite and the like). Examples of the binder include polyvinylidene fluoride (PVDF) and the like.

The amount of each component in the positive electrode paste and the dry solids content of the positive electrode paste may be the same as those of the known positive electrode paste for lithium ion secondary batteries.

When the electrode paste is a negative electrode paste for a lithium ion secondary battery, the negative electrode paste includes a negative electrode active material and a solvent. Examples of the negative electrode active material include carbon materials such as graphite, hard carbon, soft carbon, and the like. Examples of the solvent include water and the like.

The negative electrode paste may further contain a binder, a thickener, and the like. Examples of the binder include styrene butadiene rubber (SBR) and the like. Examples of the thickener include carboxymethyl cellulose (CMC) and the like.

The amount of each component in the negative electrode paste and the dry solids content of the negative electrode paste may be the same as those of the known negative electrode paste for lithium ion secondary batteries.

In the present description, the "paste" refers to a dispersion liquid in which at least a part of a solid fraction is dispersed, and thus the "paste" is inclusive of "slurry", "ink", and the like.

A known current collecting foil for a lithium ion secondary battery can be used as the current collecting foil used in the coating step. Specifically, a metal foil or the like can be used. When producing a positive electrode, an aluminum foil is suitable as the current collecting foil. When producing a negative electrode, a copper foil is suitable as the current collecting foil.

The thickness of the current collecting foil is not particularly limited, and is, for example, 5 μm or more and 35 μm or less, desirably 7 μm or more and 20 μm or less.

The specific operations of the coating step will be described with reference to FIG. 1. FIG. 1 is a schematic diagram for explaining the method for manufacturing an electrode according to the present embodiment. An electrode paste coating device 100 shown in FIG. 1 is a device suitable for carrying out the coating step. The electrode paste coating device for carrying out the coating step is not limited to that shown in FIG. 1.

The electrode paste coating device 100 shown in FIG. 1 includes a die coater unit 10 configured to coat an electrode paste 70 onto a current collecting foil 60, a backup roll 20 configured to convey the current collecting foil 60, a measuring unit 30 configured to measure the thickness and/or width of the coated electrode paste 70, and a control unit configured to control the peripheral speed of the backup roll 20. The current collecting foil 60 and the electrode paste 70 are not constituent members of the electrode paste coating device 100.

The die coater unit 10 is configured to discharge the electrode paste 70 from a discharge port of a die. The specific configuration of the die coater unit 10 may be the same as that of the usual die coater. For example, the die coater unit 10 is composed of a die provided with a discharge port and a die drive mechanism configured to move the position of the die. An electrode paste supply system (not shown) is connected to the die coater unit 10.

The backup roll 20 is configured to convey the current collecting foil 60. The specific configuration of the backup roll 20 may be the same as that of the backup roll used for usual die coating. The backup roll 20 is typically located below the discharge port of the die of the die coater unit 10, as shown in FIG. 1. However, this position of the backup roll 20 is not limiting as long as the effect of reducing the variation of the weight per unit area according to the present embodiment can be obtained. The backup roll 20 is desirably arranged near the discharge port of the die of the die coater unit 10.

The measuring unit 30 measures the thickness (that is, coating thickness) and/or width (that is, coating width) of the coated electrode paste 70. A known measuring instrument used for measuring the coating thickness or coating width can be used for the measuring unit 30. The measuring instrument may be a contact type or a non-contact type, but a non-contact type (for example, a laser displacement meter) is desirable.

The control unit 40 is connected to the measuring unit 30 by wire or wirelessly so that the measurement result of the measuring unit 30 can be received. Further, the control unit 40 is connected to the backup roll 20 by wire or wirelessly so that the peripheral speed etc. of the backup roll 20 can be controlled. As shown in the illustrated example, the control unit 40 may be connected to the die coater unit 10 by wire or wirelessly so that the position (in particular, the gap amount) of the die coater unit 10 could be adjusted. The control unit 40 is composed of a computer. The computer may include a CPU, a ROM in which a program for performing control described later is stored, a RAM, and the like. However, this configuration of the control unit 40 is not limiting as long as the control described hereinbelow is possible.

The coating can be performed by discharging the electrode paste 70 onto the current collecting foil 60 from the die coater unit 10 while transporting the current collecting foil 60 with the backup roll 20.

At the time of coating, the coating thickness can be controlled by the distance (that is, the gap amount) between the die coater unit 10 and the backup roll 20. This gap amount is shown as dimension G in FIG. 1. The coating thickness is determined by the gap amount G and the thickness of the current collecting foil 60.

Here, in general, when the electrode paste is continuously coated, the weight per unit area of the electrode paste varies as shown in the example shown in FIG. 2. Further, since the weight per unit area of the active material layer is the weight per unit area of the electrode paste after drying, the weight per unit area of the active material layer also varies. The large variation indicated by V1 in FIG. 2 is due to a change in paste viscosity or the like, and can be suppressed by feedback-controlling the gap amount G as in the related art. Meanwhile, the variation indicated by V2 is due to the periodic change of the gap amount G caused by the axial runout of the backup roll 20, the roundness of the backup roll 20 not being 0, and the like, and this variation is difficult to suppress by the conventional methods. In the present embodiment, the variation V2 caused by the backup roll 20 is suppressed.

Here, the amount of the electrode paste 70 discharged from the die coater unit 10 is constant. Therefore, as shown in FIGS. 3A and 3B, in a portion 70a having a large weight per unit area, the thickness of the coated electrode paste 70 is increased, while the width of the electrode paste 70 is narrowed. Meanwhile, as shown in FIGS. 3A and 3C, in a portion 70b having a small weight per unit area, the thickness of the coated electrode paste 70 is reduced, while the width of the electrode paste 70 is increased. FIGS. 3A to 3C are schematically drawn for convenience of reference, and the coated state of the electrode paste 70 is exaggerated so that changes in the width and thickness dimensions can be easily understood.

Therefore, in the present embodiment, a variation in the thickness and/or width of the coated electrode paste 70 is measured. In order to ascertain the variation in the weight per unit area of the electrode paste 70, it is sufficient to measure only one of the thickness and the width of the coated electrode paste 70. When measuring both the thickness and the width of the coated electrode paste 70, it is possible to easily detect a coating abnormality.

The variation in the thickness and width of the coated electrode paste 70 can be measured according to a known method. In the example shown in FIG. 1, this variation is measured by using the measuring unit 30. The measurement for the coated electrode paste 70 may be performed after the drying step. However, from the viewpoint of eliminating the influence of drying on the thickness and width of the electrode paste 70, it is desirable to perform the measurement before the drying step.

Here, the production speed is determined by the peripheral speed of the backup roll 20 that conveys the current collecting foil 60. Therefore, at the manufacturing site, it is most important for production control to accurately ascertain the production amount, and therefore, changing the peripheral speed of the backup roll 20 during coating is not usually performed. However, daringly in the present embodiment, the peripheral speed (circumferential speed) of the backup roll 20 is changed so that the aforementioned variation becomes small according to the measurement result of the variation to perform further coating.

The peripheral speed of the backup roll 20 may be changed in any way as long as the above variation becomes small. Here, as described above, the variation shown by V2 in FIG. 2 is caused by the axial runout of the backup roll 20, the roundness of the backup roll 20 being not 0, and the like (that is, due to the backup roll 20). Therefore, the variation occur periodically.

Therefore, from the viewpoint of suppressing the variation in the weight per unit area to a greater degree, the thickness of the coated electrode paste 70 is represented as a function of time or coating distance as a variable, or the width of the coated electrode paste 70 is represented as a function of time or coating distance as a variable, and based thereon, the peripheral speed is represented as a function of time or coating distance as a variable.

Figure 4:
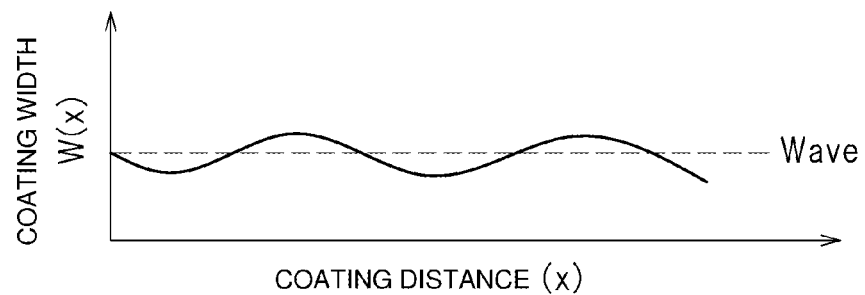
FIG. 4 is a graph showing the width of the electrode paste with respect to the coating distance when the peripheral speed of the backup roll is constant.

A specific example of such functional representation will be explained hereinbelow. FIG. 4 is a graph showing the width of the electrode paste relative to the coating distance when the peripheral speed of the backup roll is constant. It can be seen that the width of the electrode paste varies periodically. Here, where the average value of the width (coating width) of the electrode paste is $W_{ave}$ and the coating width at the coating distance x (or the coating width at the time x) is $W(x)$, the function $F(x)$ indicating the variation ratio can be expressed by the following Equation (1).

$$F(x) = W(x)/W_{ave} \qquad (1)$$

Figure 5:
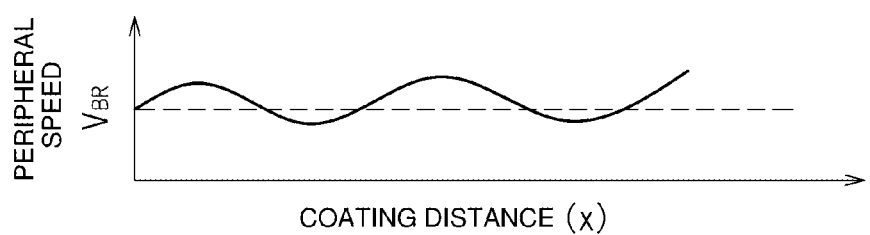
FIG. 5 is a graph representing Equation (2)

Here, where the peripheral speed of the backup roll 20 is increased at the timing when the coating width is reduced, the coating width of the electrode paste can be increased. Meanwhile, where the peripheral speed of the backup roll 20 is reduced at the timing when the coating width is increased, the coating width of the electrode paste can be reduced. Therefore, at the discharge timing of the electrode paste from the die at which the coating width becomes larger than the average according to the variation of the coating width, the peripheral speed of the backup roll 20 is made smaller than the set value. Meanwhile, at the discharging timing of the electrode paste from the die at which the coating width becomes smaller than the average, the peripheral speed of the backup roll 20 is made larger than the set value. Therefore, the peripheral speed of the backup roll 20 is changed based on the following Equation (2). Specifically, the peripheral speed of the backup roll 20 is changed according to the cycle of variation on the basis of the following Equation (2). As a reference, FIG. 5 shows a graph representing this Equation (2).

$$V_{BR} = V_{BR\_const} \times \{1 - (W(x)/W_{ave} - 1)\} \quad (2)$$

$V_{BR}$: peripheral speed of the backup roll, $V_{BR\_const}$: set value of the peripheral speed of the backup roll, $W(x)$: coating width at coating distance x (or coating width at time x), $W_{ave}$: average value of coating width.

As a specific method for changing the peripheral speed of the backup roll 20, in the example shown in FIG. 1, the measuring unit 30 measures the variation of the coating width of the electrode paste 70, and the measurement result of the measuring unit 30 is sent to the control unit 40. Based on the measurement result, the control unit 40 obtains the function W(x) for the coating width relative to the coating distance x (or the coating width relative to the time x), and the average value $W_{ave}$ of the coating width. A known function fitting method can be adopted for determining the function W(x). The Equation (2) is input to the control unit 40, and the control unit 40 performs control to change the peripheral speed of the backup roll 20 based on the Equation (2).

The present inventors actually conducted a test in which the peripheral speed of the backup roll was controlled according to the Equation (2). The change in the coating width at that time is shown in FIG. 6.

In the test, the backup roll was first rotated at a constant peripheral speed for a certain period of time (that is, until the coating distance reached 53 m in FIG. 6), and the electrode paste was coated. At this time, the variation in the width of the coated electrode paste (that is, the coating width) was measured. Then, after a certain period of time has elapsed (that is, after the coating distance reached 53 m in FIG. 6), feedback control was performed to change the peripheral speed of the backup roll based on the Equation (2) by using the variation result of the coating width. It should be noted that the measurement of the coating width was continued.

Figure 6:
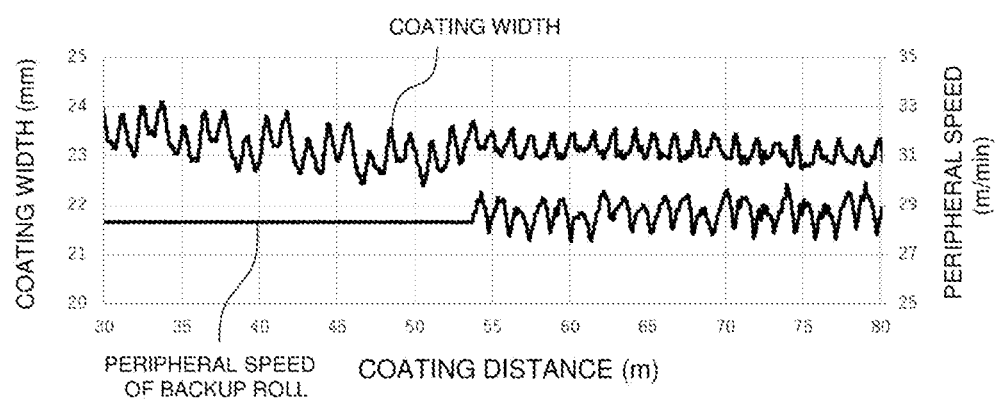
FIG. 6 is a graph showing a change in coating width with respect to coating distance in a test in which the peripheral speed of a backup roll is controlled.
Figure 7:
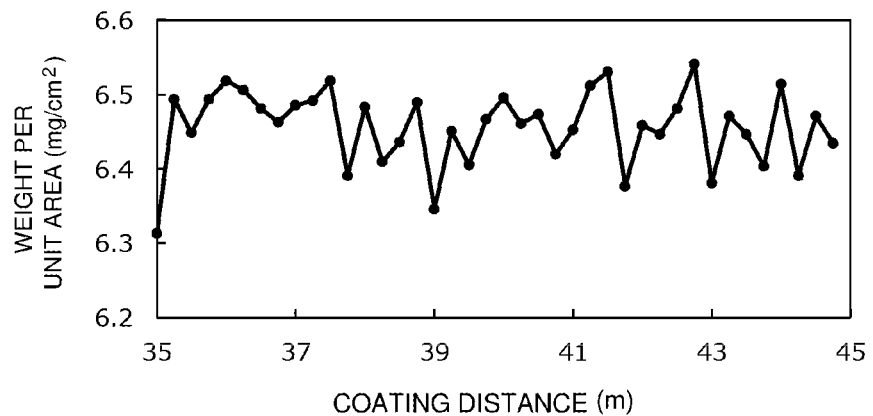
FIG. 7 is a graph showing the weight per unit area of the active material layer in the section where the coating distance in the test is 35 m to 45 m.
Figure 8:
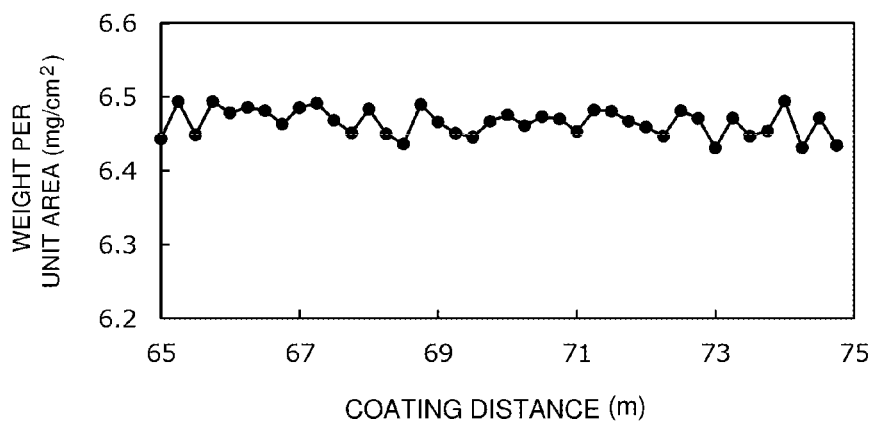
FIG. 8 is a graph showing the weight per unit area of the active material layer in the section where the coating distance in the test is 65 m to 75 m.

From FIG. 6, it can be seen that the variation of the coating width became small after the feedback control was performed. Further, the weight per unit area of the active material layer in the section where the coating distance was 35 m to 45 m and the weight per unit area of the active material layer in the section where the coating distance was 65 m to 75 m were measured. The weight per unit area in the section of 35 m to 45 m was 6.46 mg/cm$^2$±1.8%, and the weight per unit area in the section of 65 m to 75 m was 6.47 mg/cm$^2$+0.6%. For reference, the measurement results of the weight per unit area in these sections are shown in FIGS. 7 and 8, respectively.

In this way, it was demonstrated by actual examination that the variation of the weight per unit area can be reduced by measuring the coating width of the coated electrode paste and changing the peripheral speed of the backup roll according to the measurement result of the variation so that the variation becomes small. In particular, it was demonstrated that the variation of the weight per unit area can be significantly reduced by the control based on the Equation (2).

Further, as shown in FIGS. 3A to 3C, not only the coating width of the electrode paste but also the coating thickness of the electrode paste is related to the weight per unit area. Therefore, it is clear that the variation of the weight per unit area can be significantly reduced by measuring the coating thickness of the electrode paste as well.

Specifically, by increasing the peripheral speed of the backup roll 20, the coating thickness of the electrode paste 70 can be reduced. Meanwhile, by reducing the peripheral speed of the backup roll 20, the coating thickness of the electrode paste 70 can be increased. Therefore, the peripheral speed of the backup roll 20 is made larger than the set value at the discharge timing of the electrode paste from the die at which the coating thickness becomes larger than the average according to the variation of the coating thickness. Meanwhile, the peripheral speed of the backup roll 20 is made smaller than the set value at the timing of discharging the electrode paste from the die at which the coating thickness is smaller than the average. Therefore, the peripheral speed of the backup roll 20 is changed based on the following Equation (3). Specifically, the peripheral speed of the backup roll 20 is changed according to the cycle of variation on the basis of the Equation (3).

$$V_{BR} = V_{BR\_const} \times \{D(x')/D_{ave})\} \quad (3)$$

$V_{BR}$: peripheral speed of backup roll, $V_{BR\_const}$: set value of the peripheral speed of the backup roll, $D(x')$: coating thickness at coating distance x' (or coating thickness at time x'), $D_{ave}$: average value of coating thickness.

By controlling the peripheral speed of the backup roll based on the Equation (3), the variation of the weight per unit area can be significantly reduced.

Next, the drying step will be described. The drying step can be performed by drying the electrode paste, which has been coated onto the current collecting foil, according to a known method. In the example shown in FIG. 1, the electrode paste coating device 100 is combined with a dryer 50 to construct an electrode manufacturing system. The dryer 50 is, for example, a hot air dryer. In the example shown in FIG. 1, the dryer 50 is used to dry the electrode paste 70 coated onto the current collecting foil 60. However, the type of device used for drying is not limited thereto.

The drying temperature and drying time may be determined, as appropriate, according to the type of solvent used, and are not particularly limited. The drying temperature is, for example, more than 70° C. and 200° C. or lower, and desirably 110° C. or higher and 150° C. or lower. The drying time is, for example, 10 sec or more and 240 sec or less, and desirably 30 sec or more and 180 sec or less.

By carrying out the drying step, an active material layer is formed on the current collecting foil 60, and an electrode can be obtained. For the purpose of adjusting the thickness, density, etc. of the active material layer, a step of pressing the active material layer may be performed after the drying step. The pressing step can be performed according to a known method. Further, a step of cutting the electrode to a predetermined size may be performed.

As described above, it is possible to obtain an electrode in which variations in the weight per unit area of the active material layer are highly suppressed. The method for manufacturing an electrode according to the present embodiment may be combined with a conventionally known method for suppressing variations in the weight per unit area amount by controlling the gap amount.

The electrode obtained by the manufacturing method according to the present embodiment can be suitably used as an electrode of a secondary battery such as a lithium ion secondary battery according to a known method. Therefore, the method for manufacturing an electrode according to the present embodiment is desirably a method for manufacturing an electrode for a secondary battery (in particular, a lithium ion secondary battery).

In the present description, the "secondary battery" refers to a power storage device that can be charged and discharged repeatedly, and is a term inclusive of a so-called storage battery and a power storage element such as an electric double layer capacitor. Further, in the present description, the "lithium secondary battery" refers to a secondary battery that uses lithium ions as a charge carrier and realizes charge/discharge by the transfer of charges by the lithium ions between the positive and negative electrodes.

A secondary battery produced using the electrode obtained by the manufacturing method according to the present embodiment, in particular a lithium ion secondary battery, can be used for various purposes. Suitable applications include a drive power source mounted on a vehicle such as an battery electric vehicle (BEV), a hybrid electric vehicle (HEV), and a plug-in hybrid electric vehicle (PHEV); a storage battery of a small power storage device, and the like.

Although specific examples of the present disclosure have been described in detail above, these are merely examples and do not limit the scope of claims. The features set forth in the claims include various changes and modifications of the specific examples illustrated hereinabove.

What is claimed is:

1. A method for manufacturing an electrode, the method comprising the steps of:
    continuously coating an electrode paste onto a current collecting foil from a die; and
    drying the coated electrode paste,
    wherein the continuously coating the electrode paste onto the current collecting foil comprises
    discharging the electrode paste onto the current collecting foil from the die;
    conveying the current collecting foil by a backup roll;
    measuring a variation of a width of the coated electrode paste caused by an axial runout of the backup roll; and
    changing, according to the measured variation of width, a peripheral speed of the backup roll so that the variation caused by the backup roll is reduced;
    wherein the peripheral speed of the backup roll is changed based on Equation (2) below:

$$V_{BR}=V_{BR\_const}\times\{1-(W(x)/W_{ave}-1)\} \quad (2)$$

$V_{BR}$: Peripheral speed of the backup roll,
$V_{BR\_coast}$: Set value of the peripheral speed of the backup roll,
W(x): Coating width at coating distance x, or coating width at time x,
$W_{ave}$: Average value of coating width.

2. A method for manufacturing an electrode, the method comprising the steps of:
    continuously coating an electrode paste onto a current collecting foil from a die; and
    drying the coated electrode paste,
    wherein the continuously coating the electrode paste onto the current collecting foil comprises
    discharging the electrode paste onto the current collecting foil from the die;
    conveying the current collecting foil by a backup roll;
    measuring a variation in thickness of the coated electrode paste, wherein the variation is caused by an axial runout of the backup roll; and
    changing, according to the measured variation of thickness, a peripheral speed of the backup roll so that the variation caused by the backup roll is reduced;
    wherein the peripheral speed of the backup roll is changed based on Equation (3) below:

$$V_{BR}=V_{BR\_const}\times\{(D(x')/D_{ave})\} \quad (3)$$

$V_{BR}$: Peripheral speed of backup roll,
$V_{BR\_coast}$: Set value of the peripheral speed of the backup roll,
D(x'): Coating thickness at coating distance x', or coating thickness at time x',
$D_{ave}$: Average value of coating thickness.

* * * * *